(12) United States Patent
Pratt et al.

(10) Patent No.: US 8,563,676 B2
(45) Date of Patent: Oct. 22, 2013

(54) REACTIVE AMINE CATALYSTS FOR POLYURETHANE FOAM

(75) Inventors: Jennifer Koch Pratt, Round Rock, TX (US); Robert A. Grigsby, Jr., Spring, TX (US); Gene Wiltz, The Woodlands, TX (US); Ernest L. Rister, Round Rock, TX (US); Don Ridgway, Spring, TX (US); Gabor Felber, Veszprem (HU)

(73) Assignee: Huntsman Petrochemical LLC, The Woodlands, TX (US)

( * ) Notice: Subject to any disclaimer, the term of this patent is extended or adjusted under 35 U.S.C. 154(b) by 40 days.

(21) Appl. No.: 12/663,882

(22) PCT Filed: Jun. 11, 2008

(86) PCT No.: PCT/US2008/066490
§ 371 (c)(1),
(2), (4) Date: Dec. 10, 2009

(87) PCT Pub. No.: WO2008/157153
PCT Pub. Date: Dec. 24, 2008

(65) Prior Publication Data
US 2010/0179297 A1    Jul. 15, 2010

Related U.S. Application Data

(60) Provisional application No. 60/936,260, filed on Jun. 19, 2007.

(51) Int. Cl.
*C08G 18/42* (2006.01)
*C08G 18/08* (2006.01)
*C08G 18/48* (2006.01)

(52) U.S. Cl.
USPC .............................................. 528/53; 528/85

(58) Field of Classification Search
None
See application file for complete search history.

(56) References Cited

U.S. PATENT DOCUMENTS

| | | |
|---|---|---|
| 2,683,730 A | 7/1954 | Seeger et al. |
| 2,950,263 A | 8/1960 | Abbotson et al. |
| 3,012,008 A | 12/1961 | Lister |
| 3,194,773 A | 7/1965 | Hostettler |
| 3,297,597 A | 1/1967 | Edwards et al. |
| 3,330,782 A | 7/1967 | Poppelsdorf |
| 3,344,162 A | 9/1967 | Rowton |
| 3,362,979 A | 1/1968 | Bentley |
| 4,101,470 A | 7/1978 | McEntire |
| 4,338,408 A | 7/1982 | Zimmerman et al. |
| 4,433,170 A | 2/1984 | Zimmerman et al. |
| 4,767,736 A * | 8/1988 | Petrella et al. ................ 502/164 |
| 5,756,558 A * | 5/1998 | Savoca et al. ................ 521/167 |
| 5,824,711 A * | 10/1998 | Kimock et al. ................ 521/129 |
| 5,874,483 A * | 2/1999 | Savoca et al. ................ 521/115 |
| 6,051,527 A * | 4/2000 | Savoca et al. ................ 502/167 |
| 6,858,654 B1 * | 2/2005 | Wendel et al. ................ 521/129 |
| 7,009,081 B2 * | 3/2006 | Mitchell et al. ............... 564/474 |
| 7,498,017 B2 | 3/2009 | Monahan et al. |
| 2003/0004220 A1 * | 1/2003 | Ishikawa et al. .............. 521/163 |
| 2006/0155096 A1 * | 7/2006 | Matsumoto et al. ............ 528/76 |
| 2008/0015273 A1 * | 1/2008 | Burdeniuc et al. ............ 521/118 |
| 2012/0149794 A1 | 6/2012 | Burdeniuc et al. |

FOREIGN PATENT DOCUMENTS

EP    1138708 A    10/2001

OTHER PUBLICATIONS

"A Translator's Guide to Organic Chemical Nomenclature" by Chester E. Claff, Jr, Ph.D © 2000.*

* cited by examiner

*Primary Examiner* — Randy Gulakowski
*Assistant Examiner* — Jeffrey Washville
(74) *Attorney, Agent, or Firm* — Monique M. Raub

(57) ABSTRACT

Polyurethanes made using compounds of formula A:

Q-(R6)-M-(R7)-NR3R4 where Q is OH or $NR_1R_2$; M is O or $NR_5$ where $R_5$ is $R_1$ or H; $R_1$ is alkyl or an alkylene alcohol of from 1 to 6 carbons, especially $CH_3$, $CH_2CH_3$, or $CH_2CH_2OH$; $R_2$ is alkyl or an alkylene alcohol of from 1 to 6 carbons, especially $CH_3$, $CH_2CH_3$, or —$CH_2CH_2OH$; $R_3$ is hydrogen or alkyl of from 1 to 6 carbons, especially H, $CH_3$ or $CH_2CH_3$; $R_4$ is hydrogen; where $R_6$ is an alkylene group of from 2 to 5 carbons; and wherein $R_7$ is an alkylene group of from 2 to 5 carbons. Illustrative catalysts of this invention include but are not limited to N,N,N'-trimethylbis(aminoethyl)ether, dimethylaminoethoxypropylamine, and (3-aminopropyl)(2-hydroxyethyl)methylamine.

2 Claims, No Drawings

REACTIVE AMINE CATALYSTS FOR POLYURETHANE FOAM

CROSS-REFERENCE TO RELATED APPLICATIONS

This application is the National Phase of International Application PCT/US2008/066490 filed Jun. 11, 2008 which designated the U.S. and which claims priority to U.S. Provisional App. Ser. No. 60/936,260 filed Jun. 19, 2007. The noted applications are incorporated herein by reference.

BACKGROUND OF THE INVENTION

This invention generally pertains to the field of urethane catalysts. More particularly, this invention relates to the use of amine molecules that incorporate a reactive hydrogen group as urethane catalysts.

The use of a catalyst in preparing polyurethanes by the reaction of a polyisocyanate, a polyol and perhaps additional ingredients is known. The catalyst is employed to promote at least two, and sometimes three major reactions that must proceed simultaneously and competitively at balanced rates during the process in order to provide polyurethanes with the desired physical characteristics. One reaction (usually referred to as the gel reaction) is a chain-extending isocyanate-hydroxyl reaction by which a hydroxyl-containing molecule is reacted with an isocyanate-containing molecule to form a urethane. This increases the viscosity of the mixture and provides a polyurethane-containing secondary nitrogen atom in the urethane groups. A second reaction is a cross-linking isocyanate urethane reaction by which an isocyanate-containing molecule reacts with a urethane group containing a secondary nitrogen atom. The third reaction that may be involved is an isocyanate-water reaction (usually referred to as the blow reaction) that by which an isocyanate-terminated molecule is extended and by which carbon dioxide is generated to blow or assist in the blowing of foam. This third reaction is not essential if an extraneous blowing agent, such as a halogenated, normally liquid hydrocarbon, carbon dioxide, etc., is employed, but is essential if all or even part of the gas required for foam generation is to be generated by this in situ reaction (e.g. in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If the chain extension is too rapid in comparison with carbon dioxide evolution, foam rise will be restricted, resulting in a high density foam with a high percentage of poorly defined cells. The foam will not be stable in the absence of adequate crosslinking.

Typically, the catalysts used for making polyurethanes are of two general types: tertiary amines (mono and poly) and organo-tin compounds. Organometallic tin catalysts predominately favor the gelling reaction, while amine catalysts exhibit a more varied range of blow/gel balance. Using tin catalysts in flexible foam formulations also increases the quantity of closed cells contributing to foam tightness. Tertiary amines can be effective as catalysts for both the blow and the gel reactions and are often used in combination with the organic tin catalysts.

Amine catalysts which strongly promote the water-isocyanate (blowing) reaction include tertiary amine structures based on the diethylenetriamine skeleton, in particular pentamethyldiethylenetriamine, and the β-(N,N-dimethylamino) alkyl ethers, in particular bis(N,N-dimethylaminoethyl)ether (described in U.S. Pat. No. 3,330,782). Most tertiary amines used for the catalysis of polyurethane foam forming reactions such as those described above are of the fugitive type. Fugitive amines are so designated because they are not bound to the urethane polymer matrix and, therefore, can leave the matrix under certain conditions. This fugitivity results in the emission of fumes from hot foam in both molded and slabstock foam processes, Air-borne, amine vapors can be an industrial hygiene problem in foam production plants. A particular effect of the amine vapor is glaucopsia, also known as blue-haze or halovision. It is a temporary disturbance of the clarity of vision. Fugitive amines can also cause problems, such as the fogging of automotive windshields, when they are used in the preparation of fully fabricated interior automotive parts. Many prior art fugitive amines also impart an unacceptably strong amine odor to the polyurethane foam. Because of these issues, there is increasing demand in the industry for low fugitivity, low odor catalysts.

Many approaches have been taken to define amine catalysts with reduced fugitivity. Amine catalysts that contain active hydrogen functionality (e.g. —OH, —NH$_2$, and —NHR) often have limited volatility and low odor when compared to related structures that lack this functionality. Furthermore, catalysts that contain active hydrogen functionality chemically bond into the urethane during the reaction and are not released from the finished product. Catalyst structures that embody this concept are typically of low to moderate activity and promote both the blowing (water-isocyanate) and the gelling (polyol-isocyanate) reactions to varying extents.

Low odor, reactive catalyst structurally related to bis(N,N-dimethylaminoethyl)ether are described in U.S. Pat. Nos. 4,338,408 and 4,433,170. JEFFCAT® ZF-10 catalyst, 2-[N-(dimethylaminoethoxyethyl)-N-methylamino]ethanol, is an effective blowing catalyst, albeit less effective than bis(N,N-dimethylaminoethyl)ether.

Lastly, in many cases blends of catalysts containing different tertiary amine groups must be utilized in order to achieve the desired balance between gelling and flowing of foams. If a foam is out of balance, the foam will not be stable and will collapse.

It would be a substantial advance in the art if a new class of amine catalysts were discovered which overcome any of the just enumerated disadvantages of the prior art.

SUMMARY OF THE INVENTION

This invention provides a solution to one or more of the omissions or disadvantages discussed above.

The catalysts of this invention react with the isocyanate and thus becomes incorporated into the polymer structure. Reactive amine catalysts are useful for producing low-odor products that have a low volatile organic chemical content.

The present invention includes a composition of matter having the formula A:

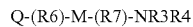

where Q is OH or NR$_1$R$_2$; M is O or NR$_5$ where R$_5$ is R$_1$ or H; R$_1$ is alkyl or an alkylene alcohol of from 1 to 6 carbons, especially CH$_3$, CH$_2$CH$_3$, or CH$_2$CH$_2$OH; R$_2$ is alkyl or an alkylene alcohol of from 1 to 6 carbons, especially CH$_3$, CH$_2$CH$_3$, or —CH$_2$CH$_2$OH; R$_3$ is hydrogen or alkyl of from 1 to 6 carbons, especially H, CH$_3$ or CH$_2$CH$_3$; R$_4$ is hydrogen; where R$_6$ is an alkylene group of from 2 to 5 carbons; and wherein R$_7$ is an alkylene group of from 2 to 5 carbons. Illustrative catalysts of this invention include but are not limited to N,N,N'-trimethylbis(aminoethyl)ether, dimethylaminoethoxypropylamine, and (3-aminopropyl)(2-hydroxyethyl)methylamine.

In one embodiment, the composition of matter is of formula B:

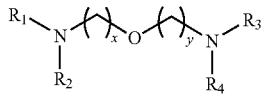

where $R_1$, $R_2$, $R_3$, $R_4$, and x is an integer between 2 and 5; and y is an integer between 2 and 5.

In one broad respect, this invention is a polyurethane formed using at least one compound of formula A. In one embodiment, the polyurethane is a foam, and is made using a blowing agent. That is, this invention includes a polyurethane that includes a compound of formula A that has been reacted into the polyurethane.

In addition, this invention describes a method for producing a polyurethane which comprises reacting an organic polyisocyanate with an organic polyester polyol or polyether polyol or blends of the two in the presence of a catalytic amount of at least one compound of formula A. In one embodiment, the polyurethane is a foam, and is made using a blowing agent. The amine catalysts described in this invention can be used alone or in combination with other known urethane catalysts.

The catalysts described in this invention catalyze the reaction between an isocyanate functionality and an active hydrogen-containing compound, i.e. an alcohol, a polyol, an amine or water.

The compounds of formula A used as catalysts in the practice of this invention have a number of advantages, including but not limited to providing polyurethane foams with improved foaming times, improved tack free times, improved cream times, and improved balance of gelling a flow, in molecules that are fugitive catalysts.

DETAILED DESCRIPTION OF THE INVENTION

Catalysts used in the practice of this invention include compounds of formula A:

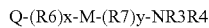

Q-(R6)x-M-(R7)y-NR3R4 where Q is OH or $NR_1R_2$; M is O or $NR_5$ where $R_5$ is $R_1$ or H; $R_1$ is alkyl or an alkylene alcohol of from 1 to 6 carbons, especially $CH_3$, $CH_2CH_3$, or $CH_2CH_2OH$; $R_2$ is alkyl or an alkylene alcohol of from 1 to 6 carbons, especially $CH_3$, $CH_2CH_3$, or $CH_2CH_2OH$; $R_3$ is hydrogen or alkyl of from 1 to 6 carbons, especially H, $CH_3$ or $CH_2CH_3$; and $R_4$ is hydrogen. Illustrative catalysts of this invention include but are not limited to N,N,N'-trimethylbis(aminoethyl)ether, dimethylaminoethoxypropylamine, and (3-aminopropyl)(2-hydroxyethyl)methylamine. The diamine ethers of formula A are known and can be made by procedures well known to those of skill in the art. Certain of the diamine ethers of formula A may be available commercially.

In one embodiment, the catalyst of formula A may be of formula B:

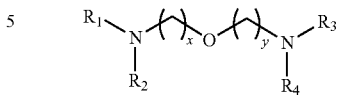

wherein $R_{1-4}$ are as defined above; x is an integer between 2 and 5; and y is an integer between 2 and 5.

Polyurethane as used herein refers to polyurethane and/or polyisocyanurate as is understood in the art. The polyurethane of this invention include polyurethane foam. Such foams may be formed by incorporation of blowing agents such as those commonly used in the art. Such blowing agents include but are not limited to hydrochlorofulorocarbons, hydrofluorocarbons, chlorofluorocarbons, pentanes, nitrogen, air, carbon dioxide, and so on. The polyurethanes can include water to help create a foam. If used, the amount of water is typically about 0.1 to about 7 parts per hundred parts of polyol.

To prepare polyurethanes using the catalysts of this invention, any suitable organic polyisocyanate may be used. Typical polyisocyanates include but are not limited to m-phenylene diisocyanate, p-phenylene diisocyanate, polymethylene polyphenylisocyanate, 2,4-toluene diisocyanate, 2,6-toluene diisocyanate, dianisidine diisocyanate, bitollene diisocyanate, napthalene-1,4-diisocyanate, xylylene-1,4-diisocyanate, xylylene-1,3-diisocyanate, bis(4-isocyanatophenyl)methane, bis(3-methyl-4-isocyanatophenyl)methane, and 4,4'-diphenylpropane diisocyanate.

In one embodiment, the polyisocyanates used in the practice of the invention include but are not limited to 2,4- and 2,6-toluene diisocyanate (TDI) and methylene-bridged polyphenyl polyisocyanate (MDI) mixtures which have a functionality of from about 2 to 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and many patents, for example, U.S. Pat. Nos. 2,683,730; 2,950,263; 3,012,008; 3,344,162; and 3,362,979, incorporated herein by reference.

In one embodiment, methylene-bridged polyphenyl polyisocyanate mixtures used here contain about 20 to about 100 weight percent methylene diphenyl diisocyanate isomers, with the remainder being polymethylene polyphenyl polyisocyanates having higher functionalities and higher molecular weights. Typical of these are the polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, incorporated herein by reference.

The hydroxyl-containing polyol component which reacts with the isocyanate may suitably be a polyester polyol or a polyether polyol. In one embodiment, the polyol has a hydroxyl number ranging from about 700 to about 25, or lower. When it is desired to provide a flexible foam, the hydroxyl number is preferably in the range from about 25 to 60. For viscoelastic foams, a mixture of polyols and low molecular weight crosslinkers is used. For rigid foams, the hydroxyl number is preferably in the range from 350 to 700. Semi-rigid foams of a desired flexibility are provided when the hydroxyl number is intermediate to the ranges just given. Also for a flexible urethane foam, the polyol can have an average functionality of from about 2 to about 4 and a molecular weight of from about 2,000 to about 6,000. For rigid foams, the functionality of the polyol component is typically from about 4 to about 8.

When the polyol is a polyester, in one embodiment the polyester is a resin having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids as phthalic acid, terephthalic acid, isophthalic acid, or the like, is non-ethylenic and non-reactive. Thus, aromatic acids may be employed for the acid component. Aliphatic acids, such as succinic acid, adipic acid, sebacic acid, and azelaic acid, may also be employed. In one embodiment, the alcohol component for the polyester contains a plurality of hydroxyl groups and may be for example an aliphatic alcohol, such as ethylene glycol, glycerol, pentaerthritol, trimethylolethane, trimethylolpropane, mannitol, sorbitol, or methyl glycoside. Mixtures of two or more of the above identified alcohols may be employed also if desired.

When the hydroxyl-containing component is a polyether polyol for use in flexible polyurethane foam, the polyol may be for example an alkylene oxide adduct of a polyhydric alcohol with a functionality of about 2 to 4. The alkylene oxide may be for example ethylene oxide, propylene oxide, or 1,2-butylene oxide, or a mixture of some or all of these. The polyol will suitably have a molecular weight within the range from about 2,000 to about 7,000. For flexible polyether polyurethane foams, the alkylene oxide is preferably propylene oxide or a mixture of propylene oxide and ethylene oxide.

For rigid polyether polyurethane foams, the polyol typically has a functionality of from about 3 to about 8 and a molecular weight of from about 300 to about 1,200. Polyols for rigid polyether polyurethane foams may be made in various ways including the addition of an alkylene oxide as above to a polyhydric alcohol with a functionality of from about 3 to 8. These polyols may also be, for example, Mannich condensation products of a phenol, an alkanolamine, and formaldehyde, which Mannich condensation product is then reacted with an alkylene oxide (see U.S. Pat. No. 3,297,597, incorporated herein by reference).

In addition to the polyether and polyester polyols, polymer or graft polyols may also be useful in the process of this invention. There are several types of polymer polyols. Generally the term graft polyol is used to describe a trio in which vinyl monomers are graft copolymerized. Styrene and acrylonitrile are the usual monomers of choice. Another type of polymer polyol referred to as polyurea modified polyol is a polyol containing a polyurea dispersion formed by the reaction of a diamine and TDI. A variant of this type of polymer polyol, called PIPA polyol, is formed by the in-situ polymerization of TDI and alkanolamine in the polyol.

The amount of hydroxyl-containing polyol compound to be used relative to the isocyanate compound in both polyester and polyether foams normally should be such that the isocyanate groups are present in at least an equivalent amount, and preferably, in slight excess, compared to the free hydroxyl groups. Preferably, the ingredients will be proportioned so as to provide from about 0.9 to about 1.5 mole equivalents of isocyanate groups per mole equivalent of hydroxyl groups. However, for certain foams we have found that using the catalyst of our invention the mole equivalents of isocyanate to hydroxyl groups can be as low as 0.4.

When water is used, the amount of water, based on the hydroxyl compound, is suitably within, the range of about 0.05 mole to about 10.0 moles per mole equivalent of hydroxy compound.

It is within the scope of the present invention to utilize a blowing agent such as a gas or a gas-producing material. Generally, these blowing agents are inert. For example, halogenated low-boiling hydrocarbons, such as trichloromonofluoromethane and methylene chloride, carbon dioxide, nitrogen, etc. may be used. The inert blowing agent reduces the amount of excess isocyanate and water that is required in preparing flexible urethane foam. For a rigid foam, the use of water is often avoided and the extraneous blowing agent is used exclusively. Selection of the proper blowing agent is well within the knowledge of those skilled in the art. See for example U.S. Pat. No. 3,072,082, incorporated herein by reference.

The catalysts of this invention are useful in the preparation of polyurethane foams, based on the combined weight of the hydroxyl-containing compound and polyisocyanates, are employed in an amount of from about 0.03 to about 10.0 weight percent. More often, the amount of catalyst used is 0.06 to about 2.0 weight percent.

The catalysts of this invention may be used either alone or in a mixture with one or more other catalysts such as tertiary amines or with an organic tin compound or other polyurethane catalysts. The organic tin compound, particularly useful in making flexible foams may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc. or a mixture thereof, may be used. Such tertiary amines include trialkylamines (e.g., trimethylamine, triethylamine), heterocyclic amines such as N-alkylmorpholines (e.g., N-methylmorpholine, N-ethylmorpholine, etc.), 1,4-dimethylpiperazine, triethylenediamine, etc., and aliphatic polyamines, such as N,N,N',N'-tetramethyl-1,3-butanediamine.

Conventional formulation ingredients are also employed, such as, for example, foam stabilizers, also known as silicon oils or emulsifiers. The foam stabilizer may be an organic silane or siloxane. For example, compounds may be used having the formula:

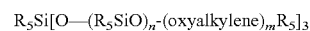

$$R_5Si[O—(R_5SiO)_n\text{-(oxyalkylene)}_m R_5]_3$$

wherein $R_5$ is independently in each occurrence an alkyl or alkylene group containing from 1 to 4 carbon atoms; n is an integer of from 4 to 8; m is an integer from 20 to 40; and the oxyalkylene groups are derived from propylene oxide and ethylene oxide. See, for example, U.S. Pat. No. 3,194,773, incorporated herein by reference.

Other conventional additives and auxiliary agents that can be employed include cell regulators, crosslinkers, flame retardants, plasticizers, fillers, pigments, among others.

In preparing a flexible foam, the ingredients may be simultaneously, intimately mixed with each other by the so-called "one-shot" method to provide a foam by a one-step process.

In this instance, water should comprise at least a part (e.g. 10% to 100%) of the blowing agent. The foregoing methods are known to those skilled in the art, as evidenced by the following publication: duPont Foam Bulletin, "Evaluation of Some Polyols in One-Shot Resilient Foams", Mar. 22, 1960.

When it is desired to prepare rigid foams, the "one-shot" method or the so-called "quasi-prepolymer method" is employed, wherein the hydroxyl-containing component preferably contains from about 4 to 8 reactive hydroxyl groups, on the average, per molecule.

In accordance with the "quasi-prepolymer method", a portion of the hydroxyl-containing component is reacted in the absence of a catalyst with the polyisocyanate component in proportions so as to provide about 20 percent to about 40 percent of free isocyanato groups in the reaction product, based on the polyol. To prepare a foam, the remaining portion of the polyol is added and the two components are allowed to react in the presence of catalytic systems such as those discussed above and other appropriate additives, such as blowing agents, foam stabilizing agents, fire retardants, etc. The blowing agent (e.g. a halogenated lower aliphatic hydrocarbon), the foam-stabilizing agent, the fire retardant, etc., may be added to either the prepolymer or remaining polyol, or both, prior to the mixing of the component, whereby at the end of the reaction a rigid polyurethane foam is provided.

Urethane elastomers and coatings may be prepared also by known techniques in accordance with the present invention wherein the catalyst of this invention is used.

The invention will be illustrated further with respect to the following specific examples, which are given by way of illustration and not as limitations on the scope of this invention.

The quantities listed in all examples are parts by weight. The foams are all prepared by conventional means using conventional polyols, isocyanates and additives. For examples in conventional foam preparation, see the disclosure for U.S. Pat. No. 4,101,470, incorporated by reference herein.

The following methods were used to prepare and evaluate the polyurethane foams described in the examples given below. The level of catalysts was varied to provide similar reaction profiles to the comparison formulations.

Foam Preparation

Selected amine catalysts were evaluated in a viscoelastic formulation. For physical properties the foams were prepared in 300×150×150 mm cardboard boxes.

Laboratory-scale trials were conducted using free-rise experiments to attain reactivity profiles and handmix technique was used to prepare foam in square mold for physical properties. The handmix was carried out using a mechanically driven mixer equipped with high shear mixing blades.

For all of the experiments, foam production involved the preparation of a pre-blend, which consists of the polyols, cell opener, water and surfactant. The pre-blend was allowed to degas prior to foam production and weighed into an appropriately sized mixing cup. The individual amine catalysts were added in appropriate quantities into the measured amount of preblend and mixed for 15 seconds in a paper cup, followed by the immediate addition of isocyanate with continued mixing for 7 seconds. The reacting foam was immediately poured into the container.

In case of flexible slabstock formulation the stannous octoate was added separately right before the isocyanate addition with 10 seconds additional mixing.

Reactivity profiles were recorded during the reaction; the cream, top of cup, end of rise, and health bubble times were recorded.

Flexible Molded Foams

The mold used in this experiment was 380×380×100 mm. The mold temperature was 45° C. to 48° C. and the demold time was 2 to 6 minutes. After demolding, the foams were mechanically crushed using a roller three times by 2-inch gap and three times by 1-inch gap. The TDI foam was post cured for 30 minutes at 65° C. The physical properties were measured after 7 days.

Flexible Slabstock Foam

Selected amine catalysts were evaluated in polyether slabstock formulations. For physical properties the foams were prepared in a 300×300×150 mm cardboard boxes and cut after 7 days.

Amine Emission Measurements—Static Headspace Test

This test determines the VOC emission of the foam according to the Volkswagen PV 3341 procedure. As we have run this test, one gram of the foam(s) was placed in a sealed vial, which was then heated to 120 C for five hours. The heated headspace in the vial was injected into a gas chromatograph. A value relative to acetone was determined as microgram carbon per gram of sample. Some result deviation may occur compared to the original automotive test due to somewhat different experimental GC conditions. However, the emission numbers generated provide a valuable comparative rating to assess the emission contributions of foams and formulation components.

Odor Panel Evaluation of Foam

As odor can be but is not always related to the level of VOC emission, odor assessments were made separately using an odor panel. In each case, only 3 foams were compared at a time. Each foam was given a rating of 3 to 1, where 3 represented the most odor and 1 the least. An average rating was calculated based on the number of participants in the panel.

Test Methods for Physical Properties

All foams produced for physical properties were conditioned for at least one week at ambient conditions and were placed in a conditioning chamber at 23 C and 50% relative humidity for at least 24 hours before the tests were run. The tests were carried out according to the ASTM D 3574 standard except the compression stress/strain characteristic, which was run according to the ISO 3386 standard and the humid aging, which was done according to the Volkswagen PV 3410.

As used herein, Experimental Catalyst 1 is N,N,N'-trimethylbis(aminoethyl)ether, Experimental Catalyst 2 is dimethylaminoethoxypropylamine, and Experimental Catalyst 3 is (3-aminopropyl)(2-hydroxyethyl)methylamine.

EXAMPLES I-VII

These examples illustrate the use of the catalysts of this invention as catalysts in TDI-based molded flexible foam applications. Examples I-IV are comparative examples Example I is an example of a fugitive catalyst system with a trace of a nonfugitive catalyst (JEFFCAT™ ZF-10) in the system Example II-IV are examples of reactive catalyst (non fugitive catalyst) used to make the foam. Examples V-VII illustrate the use of Experimental Catalyst 1 in combination with several different reactive gelling catalysts. The results are given in Table 1 below.

The cell opener is a high molecular weight polyether polyol with more than 45% ethylene oxide content but less than 80% ethylene oxide. The remainder of the oxide is propylene oxide. The initiator can be glycerol or other polyhydric alcohol. DEOA is a stabilizer used in foams and is known art.

The control catalysts are JEFFCAT(R)ZF-22 and JEFFC-AT(R) TD-33A. The control catalysts are standard practice in the urethane industry. They give high emissions and odor to the foam. The reactive catalysts did not. reactive catalysts normally give poor humid aged properties, surprisingly they gave properties equivalent to the control.

JEFFCAT™ ZR-50 is 2-propanol, 1-(bis(3-(dimethylamino) propyl)amino)-manufacture by Huntsman CAS #67151-63-7.

JEFFCAT™ DPA is 2-propanol, 1,1'-(3-(dimethylamino) propyl)imino)bis manufactured by Huntsman CAS #63469-23-8.

JEFFOL™ G-30-240 is a glycerol based polyether polyol hydroxyl number 240 mgKOH per gram manufactured by Huntsman.

Voranol CP 1431 is a glycerol based polyether polyol with greater than 40% EO that acts as a cell opener polyol manufactured by Dow Chemical Co.

Niax L-620 is a silicone surfactant used in flexible slabstock foams.

The amounts of catalysts are adjusted to give the proper reaction rates. There is less active catalyst in the controls since they are in DPG solutions but even with more or larger amounts of catalysts, the reactive catalysts give less odor by the odor panel and by the VOC test. The emissions are ⅓ the amounts of the control.

TABLE 1

Evaluation of catalysts in TDI-based molded foam formulation

| | Example | | | | | | |
|---|---|---|---|---|---|---|---|
| | I | II | III | IV | V | VI | VII |
| Polyether Polyol | 60 | 60 | 60 | 60 | 60 | 60 | 60 |
| Polymer Polyol | 40 | 40 | 40 | 40 | 40 | 40 | 40 |
| Cell Opener | 0.8 | 0.8 | 0.8 | 0.8 | 0.8 | 0.8 | 0.8 |
| DEOA | 0.7 | 0.7 | 0.7 | 0.7 | 0.7 | 0.7 | 0.7 |
| Water | 2.9 | 2.9 | 2.9 | 2.9 | 2.9 | 2.9 | 2.9 |
| Silicone Surfactants | 0.6 | 0.6 | 0.6 | 0.6 | 0.6 | 0.6 | 0.6 |
| Control Catalysts | 0.5 | | | | | | |
| JEFFCAT ® ZF-10 catalyst | | 0.12 | 0.18 | 0.18 | | | |
| JEFFCAT ® ZR-50 catalyst | | 0.37 | | | 0.37 | | |
| JEFFCAT ® DPA catalyst | | | 0.54 | | | | 0.46 |
| JEFFCAT ® Z-130 catalyst | | | | 0.39 | | 0.39 | |
| Experimental Catalyst 1 | | | | | 0.18 | 0.27 | 0.3 |
| TDI (Index 0.9) | 31.1 | 31.1 | 31.1 | 31.1 | 31.1 | 31.1 | 31.1 |
| Reaction Profile | | | | | | | |
| Cream time, s | 10 | 8 | 9 | 10 | 13 | 10 | 13 |
| Mold Fill Time, s | 60 | 70 | 70 | 78 | 80 | 100 | 98 |
| Physical Properties | | | | | | | |
| Molded Density, pcf | 2.72 | 2.86 | 2.83 | 2.92 | 2.80 | 2.84 | 2.81 |
| Air flow, scfm | 1.3 | 1.3 | 1.1 | 1.2 | 1.2 | 1.4 | 1.0 |
| Dry Properties | | | | | | | |
| Compression Set, 50% | 6.1 | 5.6 | 6.3 | 5.5 | 4.9 | 1.9 | 4.45 |
| ILD, lb/50 sq. inch | | | | | | | |
| 25% | 36 | 33 | 32 | 32 | 33 | 35 | 37 |
| 65% | 101 | 93 | 95 | 94 | 95 | 91 | 93 |
| 25% (return) | 30 | 28 | 27 | 27 | 28 | 31 | 31 |
| Tensile, psi | 22 | 20.7 | 20.3 | 20.7 | 15 | 17 | 18 |
| Elongation, % | 214 | 187 | 177 176 | 169 | 131 | 153 | 154 |
| Emission Results | | | | | | | |
| Static Headspace μg C per gram foam | 15.4 | 6.7 | 6.0 | 5.8 | 5.9 | 8.9 | 4.5 |

The control catalyst is made from 0.23 pbw JEFFCAT ™ TD-33a, 0.01pbw JEFFCAT ™ ZF-10 and 0.26 pbw of Niax 4-400

JEFFCAT™ Z-130 is 1-3-propanediamine, N'-(dimethylamino)propyl)-N,Ndimethyl—manufactured by Huntsman CAS #6711-48-4.

JEFFCAT™ ZF-22 is a 70% solution of 2,2'-oxybis(N,N-dimethylethanamine) CAS #3033-62-3 in dipropylene glycol CAS #25265-71-8 manufactured by Huntsman.

JEFFCAT™ TD-33A is a 33% solution of Triethylene diamine CAS #280-57-9 in dipropylene glycol marketed by Huntsman.

SUPRASEC 1056 is a modified MDI equivalent weight 128.8 manufactured by Huntsman.

Voranol 3010 is a glycerol based mixed EO/PO polyether polyol hydroxyl value 56 MgKOH per gram manufactured by The Dow Chemical Company.

The foams of examples V-VII possess improved foaming times, tack free times, cream times, and improved balance of gelling to flow. In Table 1, Experimental Catalyst 1 shows similar properties as the control. The compression sets are also better with this catalyst in the system. It also shows low emission results as compared to other reactive catalysts

EXAMPLES VIII-X

These examples illustrate the use of the catalysts of this invention as catalysts in MDI based molded flexible foam applications. Examples VIII and IX are comparative examples. Example X illustrates the use of Experimental Catalyst 2 in combination with a reactive gelling catalyst. The results are given in Table 2 below.

TABLE 2

Evaluation of catalysts in MDI-based molded foam formulation

| Example | VIII | IX | X |
|---|---|---|---|
| Polyether Polyol | 100 | 100 | 100 |
| Cell Opener | 1.28 | 1.28 | 1.28 |
| DEOA | 0.7 | 0.7 | 0.7 |
| Water | 3.64 | 3.64 | 3.64 |
| Silicone Surfactants | 0.52 | 0.52 | 0.52 |
| JEFFCAT ® ZF-22 catalyst | 0.08 | | |
| JEFFCAT ® ZF-TD33A catalyst | 0.25 | | |
| JEFFCAT ® ZF-10 catalyst | | 0.15 | |
| JEFFCAT ® DPA catalyst | | 0.74 | 0.85 |
| Experimental Catalyst 2 | | | 0.5 |
| Suprasec 1056 (Index 0.8) | 49.25 | 49.25 | 49.25 |
| Reaction Profile | | | |
| Cream time, s | 14 | 12 | 11 |
| Mold Fill Time, s | 98 | 72 | 56 |
| Physical Properties | | | |
| Molded Density, pcf | 3.23 | 3.18 | 3.17 |
| Air flow, scfm | 1.0 | 0.8 | 0.8 |
| Dry Properties | | | |
| Compression Set, 50% | 6.5 | 8.0 | 11.4 |
| ILD, lb/50 sq inch | | | |
| 25% | 38.4 | 29.9 | 24.5 |
| 65% | 110.8 | 79.1 | 71.2 |
| 25% ® | 30.8 | 23.4 | 19.7 |
| Tensile, psi | 16.0 | 10.7 | 12.4 |
| Elongation, % | 189 | 168 | 171 |
| Humid Aging - PV3410 | | | |
| Compression Set, 50% | | | |
| Compression Stress, kPa | | | |
| 25% | | | |
| 40% | | | |
| 65% | | | |
| Tensile, psi | | | |
| Elongation, % | | | |
| Emission Results | | | |
| Static Headspace µg C per gram foam | 13.6 | 4.4 | 4.4 |

Again in this table, the improvement is the reduced emission of this catalyst over the control. Other properties are similar.

EXAMPLES XI-XIV

These examples illustrate the use of the catalysts of this invention as catalysts in a standard flexible slabstock foam application. Examples XI and XII are comparative examples. Examples XIII and XIV illustrate the use of Experimental Catalysts 1 & 2 in combination with a typical gelling catalyst. The results are given in Table 3 below.

TABLE 3

Evaluation of catalysts in a standard flexible slabstock foam formulation

| Example | XI | XII | XIII | XIV |
|---|---|---|---|---|
| 3100 MW mixed EO/PO triol | 100 | 100 | 100 | 100 |
| Water | 4.8 | 4.8 | 4.8 | 4.8 |
| Silicone Surfactant | 1.0 | 1.0 | 1.0 | 1.0 |
| JEFFCAT ® ZF-TD33A catalyst | 0.15 | 0.15 | 0.15 | 0.15 |
| tin 2-ethylhexanoate (50% solution) | 0.27 | 0.27 | 0.27 | 0.27 |
| JEFFCAT ® ZF-22 catalyst | 0.046 | | | |
| JEFFCAT ® ZF-10 catalyst | | 0.084 | | |
| Experimental Catalyst 1 | | | 0.15 | |
| Experimental Catalyst 2 | | | | 0.15 |
| TDI (Index 1.1) | 60.53 | 60.53 | 60.53 | 60.53 |
| Reaction Profile | | | | |
| Cream time, s | 14 | 15 | 15 | 14 |
| Top of Cup, s | 64 | 69 | 72 | 64 |
| Blow Off Time, s | 92 | 88 | 93 | 89 |
| Physical Properties | | | | |
| Density, pcf | 1.3 | 1.3 | 1.3 | 1.3 |
| Air flow, scfm | 6.8 | 7 | 7.1 | |
| IFD, lb/50 sq inch | | | | |
| 25% | 33.6 | 33.9 | 31.6 | |
| 65% | 61.5 | 61.9 | 56.9 | |
| Return 25% | 23.2 | 23.4 | 21.8 | |
| Compression Sets 90% ct | 6 | 6.5 | 6.8 | |
| Resiliency, % | 37 | 37.3 | 38.3 | |
| Tear Strength, lb/in | 2.5 | 2.7 | 2.5 | |
| Std. Dev. | 0.1 | 0.1 | 0 | |
| Tensile Strength, lb/in2 | 13.1 | 13 | 13.6 | |
| Std. Dev. | 0.3 | 0.3 | 0.2 | |
| Elongation, % | 200 | 195 | 208 | |
| Std. Dev. | 5.3 | 6.2 | 2.9 | |
| Odor Panel Results | | | | |
| Average rating on a scale of 1 to 3 (3 being the most odor and 1 the least) | 2.4 | 1.9 | 1.7 | |

The foams of examples XIII and XIV possess similar physical properties but have less odor when Experimental Catalysts #1 and #2 were used in the examples.

EXAMPLES XV-XVII

These examples illustrate the use of the catalysts of this invention as catalysts in a viscoelastic foam application. Example XV is a comparative example. Examples XVI and XVII illustrate the use of Experimental Catalysts 1 and 2 in combination with a typical gelling catalyst. The results are given in Table 4 below.

TABLE 4

Evaluation of catalysts in viscoelastic foam formulation

| Example | XV | XVI | XVII |
|---|---|---|---|
| 3100 MW mixed EO/PO triol | 30 | 30 | 30 |
| 700 MW PO triol | 70 | 70 | 70 |
| 5000 MW high EO content triol Cell Opener | 7 | 7 | 7 |
| Water | 1.95 | 1.95 | 1.95 |
| Viscoelastic Surfactant | 1.0 | 1.0 | 1.0 |
| DMEA | 0.22 | 0.22 | 0.22 |
| JEFFCAT ® ZF-TD33A catalyst | 0.29 | 0.29 | 0.29 |
| tin 2-ethylhexanoate (50% solution) | 0.14 | 0.14 | 0.14 |
| JEFFCAT ® ZF-22 catalyst | 0.22 | | |
| JEFFCAT ® ZF-10 catalyst | | | |
| Experimental Catalyst 1 | | 0.48 | |
| Experimental Catalyst 2 | | | 0.48 |
| TDI (Index 0.85) | 40.3 | 40.3 | 40.3 |
| Reaction Profile | | | |
| Cream time, s | 12 | 15 | 15 |
| Top of Cup, s | 45 | 73 | 66 |
| Blow Off Time, s | 114 | 139 | 126 |

TABLE 4-continued

Evaluation of catalysts in viscoelastic foam formulation

| Example | XV | XVI | XVII |
|---|---|---|---|
| Physical Properties | | | |
| Density, pcf | 3 | 3.1 | 3.3 |
| Air flow, scfm | 1.1 | 0.4 | 1 |
| Resiliency, % | 4.2 | 4.5 | 5.5 |
| Odor Panel Results | | | |
| Average rating on a scale of 1 to 3 (3 being the most odor and 1 the least) | 2.2 | 1.7 | 1.8 |

The foams of examples XVI and XVII possess similar physical properties but have less odor when Experimental Catalysts #1 or #2 were used in the examples.

EXAMPLES XVIII-XXII

These examples illustrate the use of the catalysts of this invention as catalysts in a viscoelastic foam application. Examples XVIII and XXII are comparative examples. Examples XIX-XXI illustrate the use of Experimental Catalysts 1-3 in combination with a typical gelling catalyst. The results are given in Table 5 below. Good foams are made with Experimental Catalysts #1-3.

TABLE 5

| | XVIII | XIX | XX | XXI | XXII |
|---|---|---|---|---|---|
| Voranol 3010 | 30 | 30 | 30 | 30 | 30 |
| JEFFOL G30-240 | 70 | 70 | 70 | 70 | 70 |
| CP-1421 | 7 | 7 | 7 | 7 | 7 |
| Water | 1.95 | 1.95 | 1.95 | 1.95 | 1.95 |
| Niax L 620 | 1 | 1 | 1 | 1 | 1 |
| JEFFCAT ZF-10 catalyst | 0.22 | | | | |
| Experimental Catalyst 1 | | 0.48 | | | |
| Experimental Catalyst 2 | | | 0.48 | | |
| Experimental Catalyst 3 | | | | 0.48 | |
| JEFFCAT ZF-22 catalyst | | | | | 0.22 |
| JEFFCAT DMEA (0.2) | 0.22 | 0.22 | 0.22 | 0.22 | 0.22 |

TABLE 5-continued

| | XVIII | XIX | XX | XXI | XXII |
|---|---|---|---|---|---|
| JEFFCAT TD-33A | 0.29 | 0.29 | 0.29 | 0.29 | 0.29 |
| T-cat 140 | 0.14 | 0.14 | 0.14 | 0.14 | 0.14 |
| Index | 85 | 85 | 85 | 85 | 85 |
| TDI | 40.3 | 40.3 | 40.3 | 40.3 | 40.3 |
| Cream Time (sec) | 13 | 15 | 15 | 15 | 12 |
| Top of Cup (sec) | 62 | 73 | 66 | 78 | 45 |
| Blow Off Time (sec) | 126 | 139 | 126 | 146 | 114 |
| Density (lb/cu-ft) | 3.1 | 3.1 | 3.3 | 3.1 | 3 |
| Airflow (scfm) | 1 | 0.4 | 1 | 0.9 | 1.1 |
| Ball rebound (%) | 4.3 | 4.5 | 5.5 | 5 | 4.2 |

The foams of examples XIX-XXI possess improved foaming times, tack free times, and improved balance of gelling to flow.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A polyurethane formed using at least one compound of formula A, wherein the compound of formula A is (3-aminopropyl)(2-hydroxyethyl)methylamine, and wherein the at least one compound of formula A is present in the polyurethane in an amount of from about 0.03 to about 10.0 weight percent.

2. A process for the preparation of polyurethane, comprising:
   reacting an organic polyisocyanate with a polyol in the presence of a catalytic amount of at least one compound of formula A, wherein the compound of formula A is (3-aminopropyl)(2-hydroxyethyl)methylamine and wherein the at least one compound of formula A is present in the polyurethane in an amount of from about 0.03 to about 10.0 weight percent.

\* \* \* \* \*